Patented Feb. 2, 1943

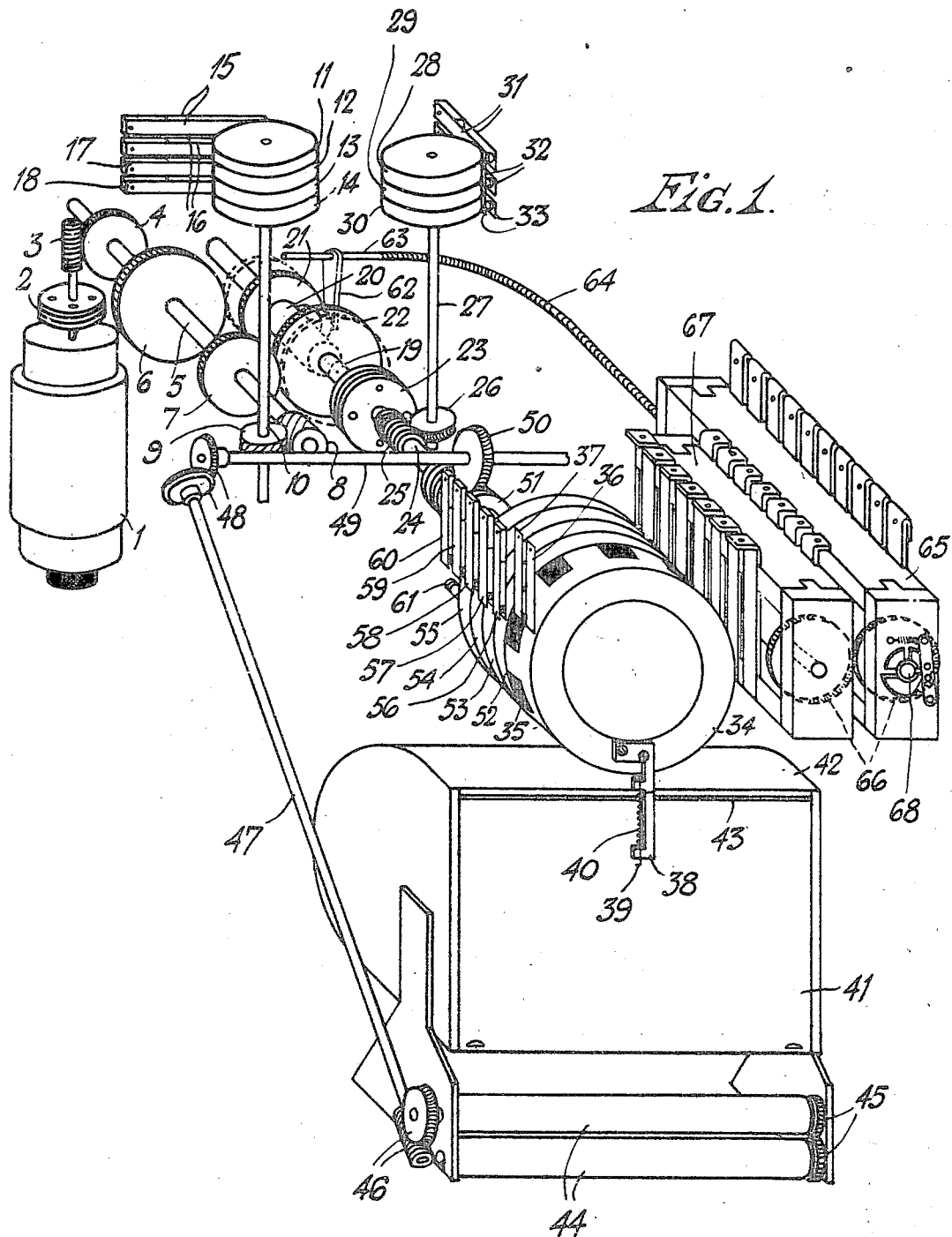

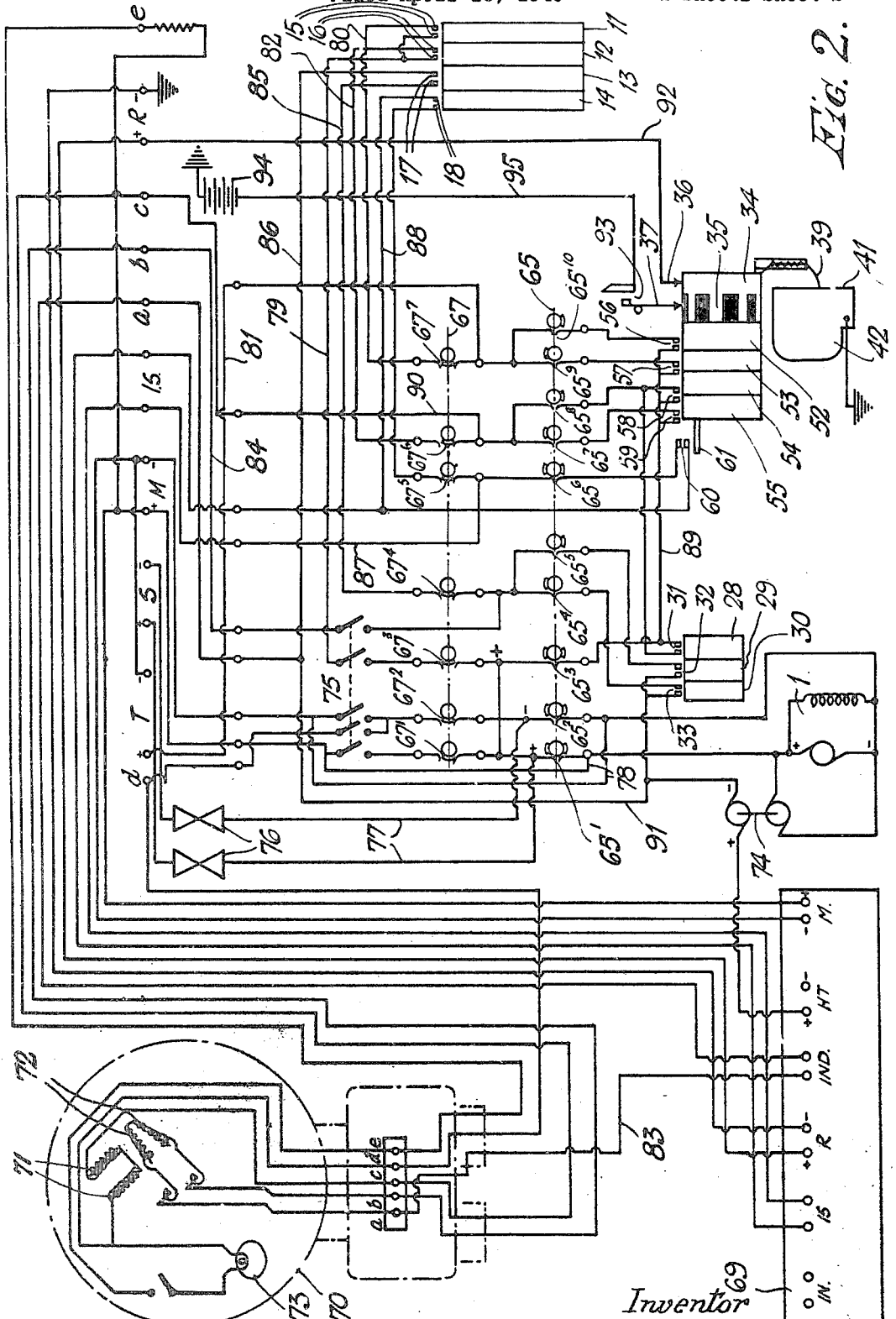

2,309,956

UNITED STATES PATENT OFFICE 2,309,956

APPARATUS FOR DEPTH MEASUREMENT

Arthur Joseph Hughes, Chigwell Row, England, assignor of one-half to Henry Hughes & Son Limited, London, England, a corporation of Great Britain Application April 16, 1940, Serial No. 329,989
In Great Britain June 28, 1939

9 Claims. (Cl. 177—386)

This invention relates to apparatus for depth measurement by the echo reception method and more particularly to apparatus including a recorder for giving a continuous record of the depth measurement on a moving chart by the use of a marking stylus moving continuously in a circular path and traversing a sensitized record strip during part of its travel.

Although such an apparatus enables continuous records to be produced at the place where the recording apparatus is situated in a ship, for instance in the chart room, it is sometimes desirable or necessary to provide, at some other part or parts of the ship and simultaneously with the production of the record, a visual indication of the depth measurement and for this purpose there can be used repeating indicators giving a temporary visual indication corresponding with the recorded information provided in permanent form by the recorder.

Accordingly, the present invention consists of echo-sounding apparatus comprising mechanism for producing a permanent record of the depth measurements and one or more repeating indicators remote from the recorder and giving only a visual indication of the depth measurement, said recording mechanism including means for actuating or controlling the indicator or indicators.

It is not always necessary, however, for the recorder and repeating indicator or indicators to be in use at the same time, and if the indicators and the recorders all have to be used whenever a permanent record is required, and similarly when indications only are needed, there results much unnecessary wear and waste of recording material and the object of the present invention is to enable either the recorder or the repeater or repeaters to be put out of action temporarily and instantly brought into use again whenever desired without affecting the operation of the parts of the system remaining in use and without impairing the accuracy of the record or the indications respectively.

Another aspect of the present invention is, therefore, that the echo sounding apparatus comprises an electrically driven recorder and one or more repeating indicators controlled electrically by the recorder in combination with switching means to give selective operation of the recorder only, or the repeater or repeaters only, or simultaneous functioning of both recorder and the repeater or repeaters.

The recorder construction may be such that its marking stylus or other recording element can be driven at different constant speeds to enable different ranges of depth measurement to be recorded and in such a case the switching means are combined with the speed changing control of the recorder so that the repeaters can be used with the recorder marking element operating at any of its different speeds, or the repeater can be used alone, or the recorder can be used by itself at any of its different speeds. The electrical impulses by which the repeaters are energised and actuated and the other necessary functions of the apparatus are effected, are conveniently controlled by pairs of contact blades which are opened and closed, at the appropriate instants during the operation of the apparatus, by cams. One set of cams and associated contacts for controlling the repeater or repeaters are driven continuously from the recorder drive independently of any speed change available in the recorder, while other sets of cams and contacts operated thereby are provided to take over the function of the previous set of contacts and cams when the recorder is in use and are driven in conjunction with the recorder mechanism after the provision for making the speed changes in the recorder drive.

The changes in speed of the travel of the recorder stylus can be provided for by driving the recorder stylus through change speed gearing, having a neutral position in which the recorder stylus is not driven and the recorder is therefore out of use, and the mechanism for moving the gears to select different speeds is coupled directly to change over switches which make the appropriate changes in the connections to the cam operated contacts when the gearing is moved from a neutral position to bring the recorder into use.

The arrangement and function of the apparatus according to the invention will be better understood from the following description and the accompanying drawings which illustrate, by way of example, a two-speed recorder associated with a single repeating indicator.

In the accompanying drawings—

Fig. 1 is a diagrammatic perspective view of the recorder and switching mechanism, with the unnecessary details such as the outer casing, shaft bearings, connecting wires and insulated supports for the blade contacts omitted for the sake of clarity;

Fig. 2 is a circuit diagram of the complete apparatus showing the electrical interconnection of the various parts.

The recorder is electrically driven and besides providing a permanent record of the depth measurements and controlling the repeating indicator, it controls the emission of a suitable sound pulse whose echo is received and amplified and passed to the marking element. The lapse of time between the emission of the sound pulse and the reception of its echo represents a measure of the depth from which the echo is received and is marked as such on the record strip.

Referring first to Fig. 1 the electric motor 1 is adapted to drive, through a coupling 2 and the worm 3 and worm wheel 4, a horizontal shaft 5 which has fixed on it two spaced gear wheels 6 and 7 of different sizes forming part of a change speed gearing and on the forward end of the shaft 5 is secured a skew gear 8 meshing with another skew gear 9 on a vertical shaft 10 carrying at its top end a set of four cams 11, 12, 13 and 14, each of which controls the opening and closing of an associated pair of blade contacts 15, 16, 17 and 18.

Parallel with the shaft 5 is another horizontal shaft 19 on which is slidable a sleeve 20 keyed or splined to the shaft 19 so as to rotate therewith and on the sleeve 20 are fixed the gears 21 and 22 constituting the movable gears of the change speed gearing. In the position shown the gears are in neutral position and there is no drive from shaft 5 to shaft 19 but when the sleeve 20 is moved rearwardly to bring the gear 21 into mesh with the gear 6, the shaft 19 is driven at a higher speed than the shaft 5, while if the sleeve is moved forward to bring the gear 22 into its dotted position meshing with gear 7, the shaft 19 is driven at a slower speed than the shaft 5.

The shaft 19 is connected by coupling 23 to an extension shaft 24 having a worm 25 fixed thereon meshing with a worm wheel 26 on the lower end of a vertical shaft 27 carrying at its upper end a set of three cams 28, 29 and 30 controlling the opening and closing of the associated pairs of blade contacts 31, 32 and 33. The shaft 24 also carries at its forward end a disc or slip ring 34 and a segmented ring 35 consisting of separated conducting segments integral with the ring 34. On the rings 34 and 35 rest a pair of brushes 36 and 37 and the disc 34 has secured to it an arm 38 projecting radially from the disc 34 and carrying a marking stylus 39 which is pressed by spring 40 towards the flat front surface 41 (constituting a platen) of a container 42 within which is mounted a roll of suitably sensitized paper strip (not shown) which is withdrawn through a slot 43 at the top of the container. The record strip is continuously drawn down over the platen 41 by feed rollers 44 geared together by gears 45 and driven, through the gearing 46, from an inclined shaft 47 which is driven through the bevel gearing 48, shaft 49 and the worm wheel 50 and the worm 51 on shaft 24.

When the shaft 24 is driven the stylus 39 moves round in a circular path, part of which crosses the record strip, so that the stylus intermittently traverses the record strip in an arcuate path and the strip is treated with a suitable chemical so that when an electrical current is passed through the brush 36 and the slip ring 34 and the stylus 39 and through the record strip to the casing 42, the sensitized paper will be stained and a permanent mark made thereon.

Behind the rings 34 and 35 the shaft 24 has secured on it four cams 52—55 which control the opening and closing of associated pairs of blade contacts 56—59 while a separate pair of contact blades 60 are closed for a brief period during each revolution of shaft 24 by a pin 61 projecting from the rear face of the cam 55.

The change speed gears 21 and 22 are moved by means of an arm 62 projecting into a groove in the sleeve 20 or making other suitable connection with the sleeve 20 and this arm 62 is secured on a spindle 63 coupled by a flexible shaft 64 to the operating spindle of a main switch 65 interconnected by gearing 66 with the spindle of an auxiliary switch 67 alongside the main switch 65. The spindle of the main switch 65 can be turned by means of a knob (not shown, but projecting from the front of the casing containing the apparatus) engaging with a coupling and locator 68 at the front of the main switch 65. Rotation of the main switch spindle, besides opening and closing the appropriate contacts as described below, turns the spindle 63 to move the change speed gears for either a fast or slow drive to the recording stylus, or to move the slidable gears into a neutral position in which the recording stylus is not driven. It will be noted, however, that the shaft 5 and the cam assembly 11—14 driven therefrom are always driven by the motor 1. Selection of the speed at which the stylus is driven enables the record produced by the stylus to be related either to an open scale for accurate measurement of shallow depths or to a closer scale of greater range for measurement of greater depths.

Referring now to Fig. 2 which shows a circuit diagram of a complete installation, the electrical connections of the recorder above described are illustrated on the right hand side of Fig. 2 the cams and cooperating pairs of blade contacts and other parts having the same reference numerals as in Fig. 1. The main switch 65 and auxiliary switch 67 are shown with their contacts and operating members developed out.

Associated with the recorder is a thermionic amplifier 69 and one or more repeating indicators, one of which is shown diagrammatically at 70 on the left of Fig. 2, and is placed in any convenient position and connected to the recorder and amplifier by a multi-way cable.

The repeating indicator illustrated is of the kind described in U. S. Patent No. 2,260,347, the indicator having an actuating electro-magnet 71, referred to in the above mentioned specification as a timing magnet, and also provided with indicating coils 72 corresponding with the pulse magnet in the aforesaid specification. The indicator 70 is also provided with a lamp 73 and the connections from the internal parts are brought out to terminals, $a$, $b$, $c$, $d$, $e$, which are connected by the multi-way cable with the correspondingly lettered terminals of the recorder, the terminals $a$ being joined through the amplifier.

The thermionic amplifier has input terminals IN through which a voltage produced by the reception of an echo by a suitable receiver is applied to the grid of the first valve of the amplifier, while another pair of terminals marked "I. S." are connected internally of the amplifier to enable initial suppression to be effected by applying a biasing voltage to the first valve of the amplifier, in excess of that normally required, to reduce the amplification immediately prior to the transmission of the signal whose echo is to be received, to avoid the recording of spurious echoes.

Another pair of terminals R enable an output voltage from an intermediate stage of the amplifier to be applied to the recorder, while the terminals marked "IND" are the final output terminals of the amplifier from which voltages are applied to the indicating coils 72 of the repeater 70 as described later. Other terminals marked "HT" and "M" are provided for the supply of high tension current to the amplifier and for a mains supply to the heaters of the thermionic valves, respectively.

The high tension supply to the amplifier is preferably provided by a motor generator 74 with its motor connected in parallel with the motor 1, and the pairs of terminals I. S., R and M on the amplifier are connected directly to correspondingly marked pairs of terminals on the recording apparatus. The incoming current supply, for instance from a ship's supply mains, is connected to the terminals S on the recorder and another pair of terminals T on the recorder are connected by external connections to a suitable transmitter (not shown) for producing the sound pulse whose echo is received to enable depth to be measured.

Besides the main and auxiliary switches on the recorder there is a separate five-pole on-off switch 75 which is closed when it is desired to operate the repeating indicator or indicators. The switching means and cam-operated contacts provide for the repeater to be used with the recorder operating at either of its two speeds or for the repeater to be used without the recorder, while, by opening the switch 75, the recorder can be used alone at either of its two speeds without giving a remote indication on the repeater.

The main and auxiliary switches 65 and 67 are shown in the positions they occupy when the repeater is to be used without the recorder, and when the switch 75 is closed a circuit is provided from the incoming mains at S through the fuses 76 and leads 77 to the closed contacts $67^1$, $67^2$ of the auxiliary switch 67 and through the closed switch 75 and leads 78 to the motor 1 which consequently starts running to rotate the cams 11 to 14 only, since the change speed gear of the recorder is in neutral position when the main switch 65 is at open position. The mains supply to terminals M of the amplifier is also completed, while the motor generator 74 also starts running to supply high tension current to the amplifier. As the cams 11—14 rotate, the cam 11 holds contacts 15 closed through most of a revolution of the cams and a circuit ready to operate the transmitter is set up from the positive supply lead 77 through contact $67^3$ of the auxiliary switch and the closed switch 75, lead 79 closed contacts 15, lead 80, contacts $67^7$ of the auxiliary switch, and lead 81 to the terminal T+. The terminal T— is returned directly to terminal M—. The breaking of the transmitter circuit due to opening of contacts 15 by cam 11 causes the production of a sound pulse from the transmitter.

Immediately before the transmission occurs the contacts 16 are opened by the rotation of their actuating cam 12 and remain open for part of the revolution of the cams and then close for the remainder of the time. When the contacts 16 are closed an energizing circuit through the actuating coils 71 of the repeater 70 is completed from the positive supply lead as before to lead 79 and then through the closed contacts 16 and lead 82 and contact $67^6$ of the auxiliary switch to terminal c of the recorder, and thence to terminal c of the repeater through the coils 71 and back through terminals d—d, the closed switch 75 and contact $67^2$ of the auxiliary switch to the negative supply lead.

When an echo is received, the output from the amplifier is passed through a lead 83 from one of the IND terminals of the amplifier to terminal a of the repeater, thence through the indicating coils 72 back to terminal b of the repeater, then to terminal b on the recorder, the lead 84, closed switch 75 and contact $67^4$ of the auxiliary switch 67 and lead 85 to the pair of blade contacts 17 which are closed by their operating cam 13. The contacts 17 are closed, after transmission occurs, for a sufficient period to allow the indicator to cover its maximum range and then open to prevent the registration of echoes which may arrive after the indicator coils 72 have reached the end of the scale. The indicating circuit is completed from contacts 17, through lead 86 to H. T.— and recorder terminal a and thence to the other IND terminal of the amplifier.

The pair of contact blades 18 control the initial suppression previously referred to and are open for most of a revolution of the cam 14, but are closed for a brief period just before transmission occurs and open again immediately prior to the moment of transmission. When closed they complete a circuit across the I. S. terminals through lead 87, contacts $67^5$ of the auxiliary switch, closed contacts 18 and lead 88. The closure of the circuit across the I. S. terminals completes a circuit within the amplifier which reduces the amplification thereof, while transmission occurs, in order to prevent an accidental recording of the transmitted sound, and the amplification of the amplifier 69 increases again ready for the reception of the echo.

When it is desired to bring the recorder into use, the main switch is turned to change over the appropriate circuits and to bring either of the gears 21 or 22 into mesh with its associated gear according to the recorder speed desired, i. e. a high speed for working to a shallow depth scale or a low speed for working to greater depths. Rotation of the main switch 65 in either direction simultaneously moves the auxiliary switch to open all of its contacts $67^1$—$67^7$ (thus cutting out the pairs of contacts 15—18) but a supply circuit to the motor 1 is established, in either position of the main switch, through it contacts $65^1$ and $65^2$, while the positive supply main is connected, through the contact $65^3$, to one side of all the pairs of contacts 31, 56—59 and the initial suppression control is now taken over by contacts 60 which are connected across the I. S. terminals, in place of contacts 18, by closure of main switch contact $65^6$ in either position of the main switch.

Of the other main switch contacts, only $65^4$, $65^7$ and $65^9$ are closed when the recorder operates at low speed and in this case contacts 57 control the transmitter through a circuit from the positive side of the supply, closed contacts $65^3$, lead 89, contacts 57, main switch contact $65^9$ and lead 81 to the terminal T+. The main switch contact $65^7$ enables a circuit to be established for contacts 59 to control the energisation of the repeater actuating coils 71 from the positive supply lead and lead 89 as before, contacts 59, switch contact $65^7$ and lead 90, terminals c—c, coils 71, terminals d—d, the pair of contacts of switch 75, and the lead 78 connected to the negative supply lead through contacts $65^2$. The closure of the main switch contact $65^4$ enables contacts 33 to take over the function previously effected by contacts 17 by connecting contacts 33 across the recorder terminals a, b through lead 91, contacts 33, contacts 65⁴, and closed switch 75. The cams 53, 55 and 30 are set to close the contacts 57, 59 and 33 in the same sequence and for the same periods as the contacts 15, 16 and 17 when the repeater was used alone.

When the recorder is run at high speed, the main switch contacts 65⁴, 65⁷ and 65⁹ are opened and contacts 65⁵, 65⁸ and 65¹⁰ are closed. The contacts 56 are then connected in place of contacts 57; contacts 58 are connected in place of contacts 59, while contacts 32 are connected in place of contacts 33. These substitutions enable the periods of closure of the circuits controlled thereby to be altered appropriately to the higher speed of the recorder. The contacts 31 are connected in shunt with the contacts 58 and when the recorder is running at high speed they prevent the actuating coils 71 of the repeater from being energised at a frequency greater than the natural frequency of swing of the arm carrying the indicator coils.

Thus the repeater 70 can be used with the recorder running at either of its two speeds, but if switch 75 is opened, the repeater is put out of action and the recorder can be used alone at either of its speeds. In this latter case only the transmitter-controlling contacts 56 or 57 and the initial suppression contacts 60 are effectively operative.

In all cases when the recorder is in use the amplified echo pulses at terminals R are applied through lead 92 from terminal R to brush 36 slip ring 34, stylus 39 and platen 41 and container 42 to earth on the recorder. The terminal R— of the recorder is likewise earthed to complete the circuit. A record of the depth indication is thus obtained in the form of a series of closely spaced marks which appear as a continuous line on the record strip. The brush 37 and the spaced conducting segments of ring 35 enable spaced marks denoting equal intervals of time or distance to be made on the record strip (at the same time as the depth record) by closure of an interval marking switch 93 which supplies current from a battery 94, through lead 95 and switch 93 to brush 37 and ring 35, thence to ring 34 and through the stylus to earth as before.

The connection between terminals e—e of the recorder and repeater enable a supply to the lamp 73 of the repeater 70 to be provided from terminal M+, terminals e—e and back through terminals d—d to terminal M— when the repeater is in use and switch 75 is closed.

Although the repeaters are preferably of the type described in U. S. Patent No. 2,260,347 it is possible to use other types of repeater, if desired.

What I claim as my invention and desire to secure by Letters Patent is:

1. A recording and indicating apparatus for echo-sounding apparatus comprising a support for a record sheet, a stylus movably mounted adjacent to said sheet, constant speed driving means for moving said stylus across said sheet, a change speed gearing connected between said stylus and said driving means for moving said stylus selectively at two different speeds and for disconnecting said stylus from said driving means, shifting means for shifting said change speed gearing, a repeating indicator having a movable member for giving a visual indication, means for moving said member, first switching means actuated by said driving means and movable with said stylus for supplying operating impulses to said indicator to cause said movable member to give indications corresponding to the record made by said stylus on said record sheet, a second switching means actuated by said driving means electrically connected to said indicator for supplying operating impulses to said indicator independently of said stylus, and means mechanically connected to said shifting means for rendering said second switching means effective to supply electrical impulses to said indicator when said stylus is disconnected from said driving means and said first switching means ineffective, and for rendering said second switching means ineffective and said first switching means effective to supply operating impulses to said indicator when said stylus is driven by said driving means.

2. A recording and indicating apparatus for echo-sounding apparatus comprising a support for a record sheet, a stylus movably mounted adjacent to said sheet, constant speed driving means for moving said stylus across said sheet, a change speed gearing connected between said stylus and said driving means for moving said stylus selectively at two different speeds and for disconnecting said stylus from said driving means, shifting means for shifting said change speed gearing, a repeating indicator having a movable member for giving a visual indication, means for moving said member, first switching means actuated by said driving means and movable with said stylus for supplying operating impulses to said indicator to cause said movable member to give indications corresponding to the records made by said stylus on said record sheet, a second switching means actuated by said driving means electrically connected to said indicator for supplying operating impulses to said indicator independently of said stylus, and third switching means mechanically connected to said shifting means and electrically connected to said first and second switching means for electrically connecting said indicator to said second switching means when said stylus is disconnected from said driving means and electrically disconnecting said indicator and said first switching means, and for electrically connecting said indicator and said first switching means when said stylus is moved by said driving means and electrically disconnecting said indicator and said second switching means.

3. Echo-sounding apparatus comprising a recorder having a rotary marking stylus, means for moving a record strip beneath said stylus, constant speed driving means for rotating the stylus across the record strip, change-speed gearing interposed between said stylus and said driving means for driving said stylus at two different speeds, said gearing having a neutral position, an electrically controlled repeating indicator, switching contacts on the recorder electrically connected to said indicator, cam means rotatable with said stylus for opening and closing said switching contacts, means for shifting said change speed gearing, and change-over switches mechanically coupled to the shifting means for the change-speed gearing to operate simultaneously with a change in speed of the stylus and electrically connected in circuits with said switching contacts to effect alterations in the circuits to the contacts and indicator when the change-speed gearing is moved to neutral position or to positions giving different speeds of stylus movement.

4. Echo-sounding apparatus according to claim 3 comprising a sound transmitter, an echo receiver, an amplifier electrically connected to said receiver and energizing said indicator and said recorder, other cam-operated contacts connected in said circuits for closing of circuits to a sound transmitter and for initially suppressing the response of said amplifier to a received echo, the circuit connections to said other cam operated contacts being changed when the switches are operated.

5. Apparatus comprising in combination, a recorder producing a permanent record and having a movable marking element, constant speed driving means therefor, speed changing means interposed between said marking element and said driving means, a repeating indicator separate from the recorder and giving only a visual indication, a group of cams driven constantly by said driving means, electrical contacts operated by said cams, electrical circuits connecting said contacts and said indicator, other groups of cams driven simultaneously with said marking element, electrical contacts operated by said other groups of cams, electrical circuits connecting the last-mentioned contacts and said indicator, and switching means interposed in said circuits and mechanically coupled to said speed changing means to alter the electrical circuits between said electrical contacts and said indicator simultaneously with alteration in the speed of said marking element.

6. Echo-sounding apparatus comprising in combination a recorder producing a permanent record and having a movable marking element, a constant speed motor for driving said movable marking element, speed changing gearing interposed between said marking element and said motor, said speed changing gearing having a neutral position, a repeating indicator separate from the recorder and giving only a visual indication, cams driven constantly by said motor, switching contacts opened and closed by said cams, electrical circuits connecting said indicator and said switching contacts, a second group of cams driven simultaneously with said marking element, a second group of switching contacts opened and closed by said second group of cams, additional electrical circuits connecting said indicator and said second group of switching contacts, a main multiple switch and an auxiliary multiple switch having their switching contacts interposed in the first-mentioned and the additional electrical circuits, said switches being geared together and mechanically coupled to said speed changing gearing to open said main switch and close the auxiliary switch when the change speed gearing is in neutral position to render only the first-mentioned set of circuits operative, and to close said main switch and open the auxiliary switch when the change speed gearing is used to render the additional circuits operative in place of the first-mentioned circuits.

7. Echo-sounding apparatus according to claim 6 comprising contacts in said auxiliary switch for connecting and disconnecting said motor and a source of electrical energy, and switching contacts in said main switch for connecting said motor to said source when said contacts in said auxiliary switch are open.

8. In a recording and indicating device for echo sounders the combination of a recorder having a movable marking element, driving means for said marking element, a change speed gearing having a neutral position interposed between said marking element and said driving means, shifting means for said change speed gearing, a set of cams continuously driven by said driving means, first electrical contacts opened and closed by said cams, a second group of cams movable simultaneously with said marking element, an electrically actuated indicator electrically connected in different circuits with said first and second groups of electrical contacts, additional multiple contact switches electrically connected in said circuits for selectively connecting said indicator to said first electrical contacts only, and to said second group of electrical contacts, only, and means coupling said additional switches to said shifting means to vary selectively the speed of said marking element and the corresponding position of said switches to cause the indications on said indicator to correspond to those on said recorder.

9. A recording and indicating apparatus for echo-sounding apparatus comprising a support for a record sheet, a stylus movably mounted adjacent to said sheet, constant speed driving means for moving said stylus across said sheet, a change speed gearing connected between said stylus and said driving means for moving said stylus selectively at two different speeds and for disconnecting said stylus from said driving means, shifting means for shifting said change speed gearing, a repeating indicator having a movable member for giving a visual indication, means for moving said member, first switching means actuated by said driving means and movable with said stylus for supplying operating impulses to said indicator to cause said movable member to give indications corresponding to the records made by said stylus on said record sheet, a second switching means actuated by said driving means independently of said stylus electrically connected to said indicator for supplying operating impulses to said indicator, third switching means mechanically connected to said shifting means and electrically connected to said first and second switching means for electrically connecting said indicator to said second switching means when said stylus is disconnected from said driving means and electrically disconnecting said indicator and said first switching means, and for electrically connecting said indicator and said first switching means when said stylus is moved by said driving means and electrically disconnecting said indicator and said second switching means, and manually actuated switching means for selectively connecting and disconnecting said first switching means and said indicator.

ARTHUR JOSEPH HUGHES.